W. W. Smith,
Driving-Wheel Ratchet.
Nº 70,371.   Patented Oct. 29, 1867.
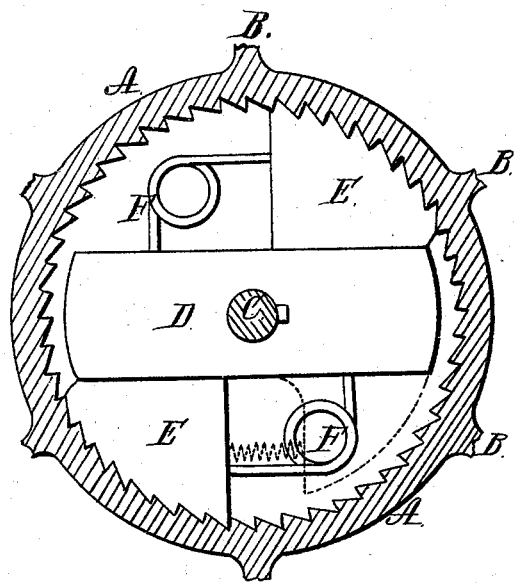
Witnesses:
A. A. Seatman,
Cornelius Coe
Inventor:
W. W. Smith
per
Alexander & Mason
Atty

United States Patent Office.

W. W. SMITH, OF STRONGSVILLE, OHIO.

Letters Patent No. 70,371, dated October 29, 1867.

---

IMPROVEMENT IN RATCHET FOR DRIVING-WHEELS.

---

The Schedule referred to in these Letters Patent and making part of the same.

---

TO ALL WHOM IT MAY CONCERN:

Be it known that I, W. W. SMITH, of Strongsville, in the county of Cuyahoga, and in the State of Ohio, have invented certain new and useful Improvements in Ratchet for Driving-Wheel; and do hereby declare that the following is a full, clear, and exact description thereof, reference being had to the accompanying drawings, and to the letters of reference marked thereon.

In the annexed drawings, making part of this specification, A represents the hub of the driving-wheel of a reaping or mowing machine, B B representing the position of the spokes of the wheel. In one face of this hub is formed an annular recess, which is made large enough in diameter so that only a strong rim is left between it and the periphery of the wheel. On the inner surface of this rim are formed ratchet-teeth, as represented, extending entirely around it. C represents the axle of the wheel, which has secured to it a cross-piece, D, said cross-piece lying in the recess in the hub. E E represent two blocks, which are triangular in shape, the hypothenuse of the triangle being curved and provided with ratchet-teeth, to correspond with those of rim of the wheel. These blocks are pressed toward the rim, and held in position by means of the springs F F, one end of said springs being secured to the cross-piece D, and the other to the blocks. By this arrangement the hub is allowed to revolve upon the shaft, or stationed and secured fast to it. The blocks E E, having a series of teeth, which press into as many upon the rim of the hub, and pressing against the rim on two opposite sides at the same time, serve to give strength and security to the attachment. A cap is fitted over the face of the hub, in which the recess is formed, to confine the blocks in proper position, and to keep out dust and dirt.

Having thus fully described my invention, what I claim as new, and desire to secure by Letters Patent, is—

The blocks E E, shaft C, cross-piece D, springs F F, and hub A, constructed, combined, and used, as and for the purpose set forth.

In testimony that I claim the foregoing I have hereunto set my hand this 3d day of September, 1867.

W. W. SMITH.

Witnesses:
 E. H. WING,
 M. GALLUP.